(No Model.)  4 Sheets—Sheet 1.
W. L. FITCH.
APPARATUS FOR USE IN TEACHING MUSIC.
No. 355,261.  Patented Dec. 28, 1886.
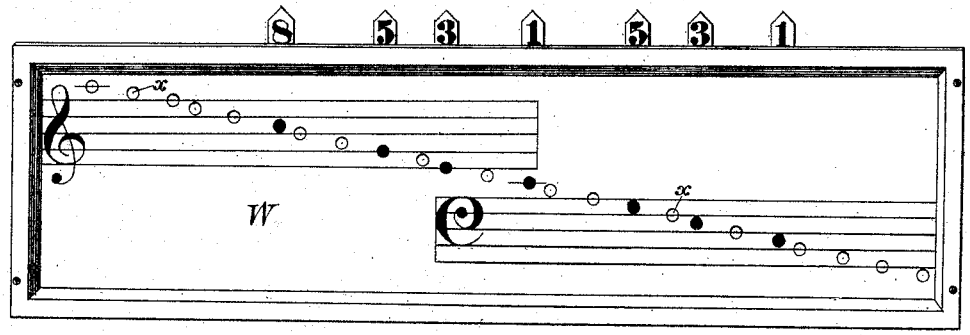
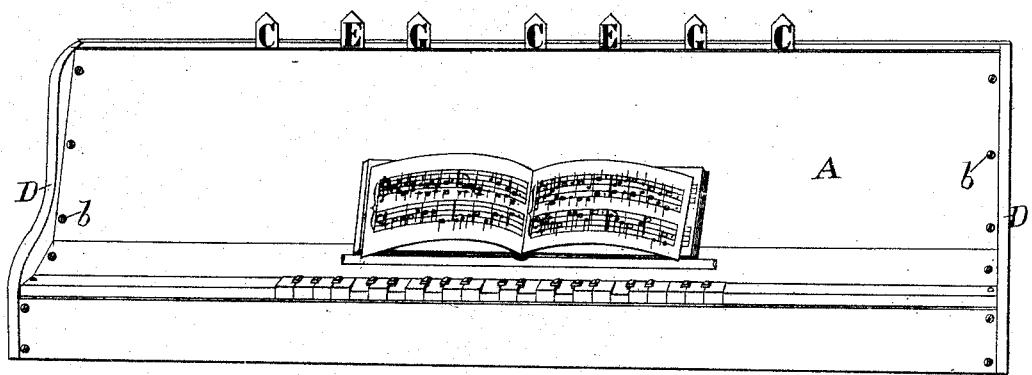
Witnesses:
Herbert G. Riggs
Fred. A. Tompkson
Inventor.
William L. Fitch (No Model.) 4 Sheets—Sheet 2.

W. L. FITCH.
APPARATUS FOR USE IN TEACHING MUSIC.

No. 355,261. Patented Dec. 28, 1886.

Witnesses:
Herbert G. Briggs
Fred. A. Tompson

Inventor.
William L. Fitch (No Model.) 4 Sheets—Sheet 3.

W. L. FITCH.
APPARATUS FOR USE IN TEACHING MUSIC.

No. 355,261. Patented Dec. 28, 1886.

Witnesses:
Herbert G. Briggs
Fred. A. Tompson

Inventor.
William L. Fitch (No Model.) 4 Sheets—Sheet 4.

W. L. FITCH.
APPARATUS FOR USE IN TEACHING MUSIC.

No. 355,261. Patented Dec. 28, 1886.

Witnesses:
Herbert G. Briggs
Fred. A. Tompson

Inventor,
William L. Fitch

UNITED STATES PATENT OFFICE.

WILLIAM L. FITCH, OF PORTLAND, MAINE.

APPARATUS FOR USE IN TEACHING MUSIC.

SPECIFICATION forming part of Letters Patent No. 355,261, dated December 28, 1886.

Application filed June 10, 1886. Serial No. 204,774. (No model.)

*To all whom it may concern:*

Be it known that I, WILLIAM L. FITCH, residing at Portland, in the county of Cumberland and State of Maine, have invented certain new and useful Improvements in Vocal-Music-Teaching Apparatus; and I do hereby declare that the following is a full, clear, and exact description of the invention, which will enable others skilled in the art to which it appertains to make and use the same.

This invention relates to a novel apparatus for the use of instructors in teaching vocal-music reading; and it consists of certain new and ingenious devices and combinations of the same, which are described in the subjoined specification, and particularly pointed out in the claims at the end of said specification.

In order that the invention may be fully understood, I have shown in the accompanying drawings a vocal-music-teaching apparatus embodying the invention in the best form now known to me, and I will proceed to explain the same, it being understood that the apparatus may be changed in its details of construction without departing from the principle of the invention claimed, as special circumstances render necessary, or the ideas of various builders or operators of the apparatus deem expedient.

Figure 3:
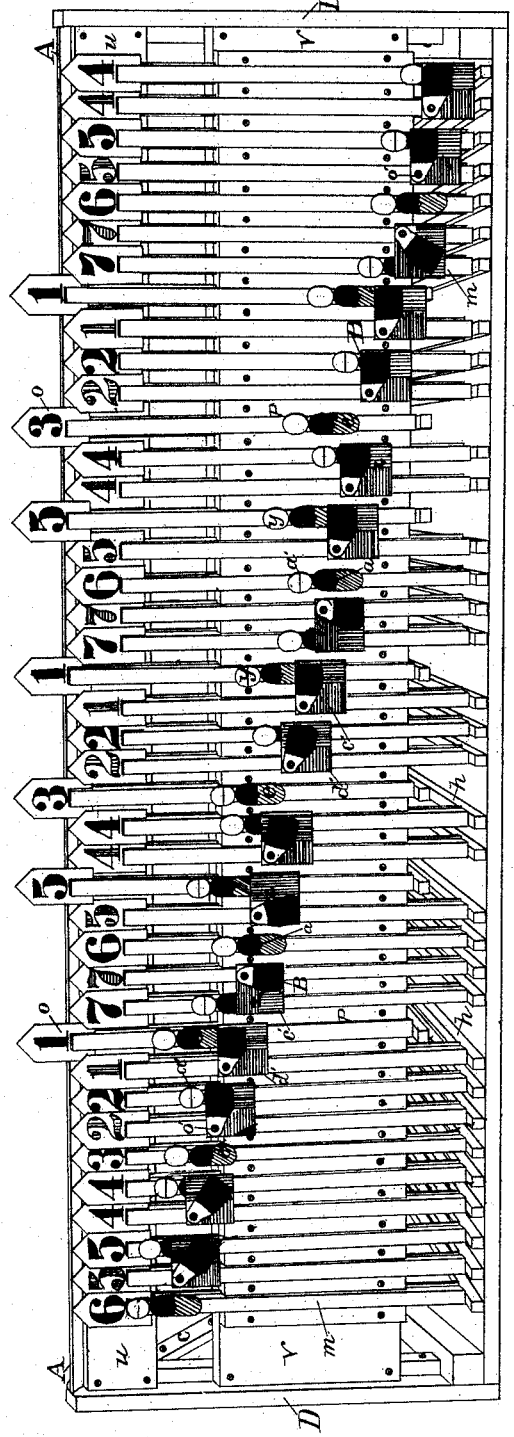
Figure 4:
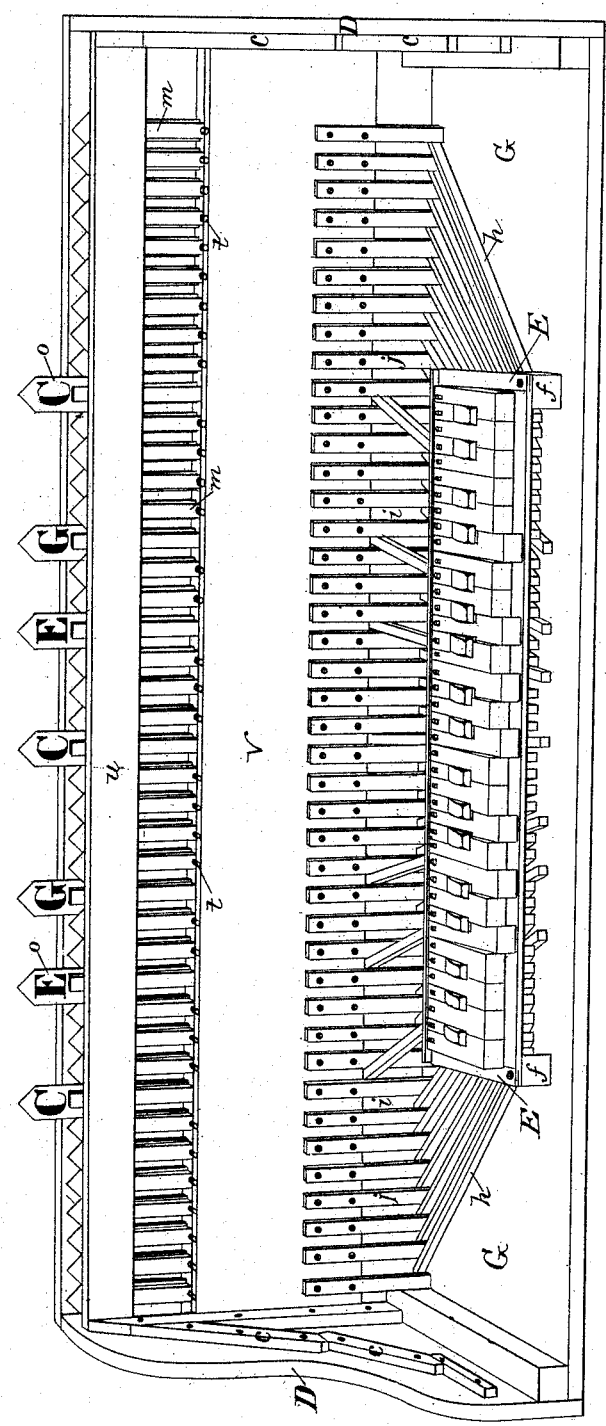
Figure 8:
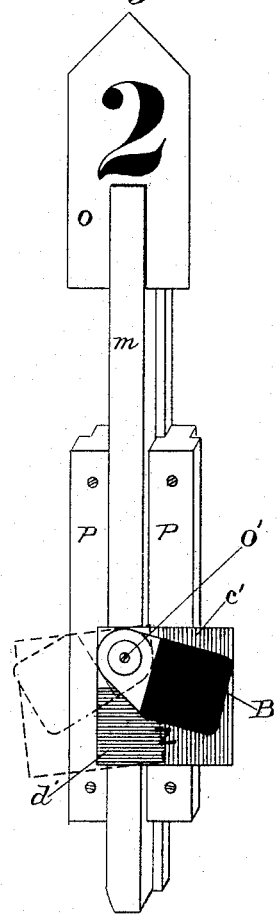
Figure 6:
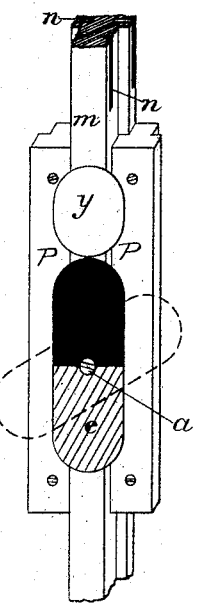
Figure 7:
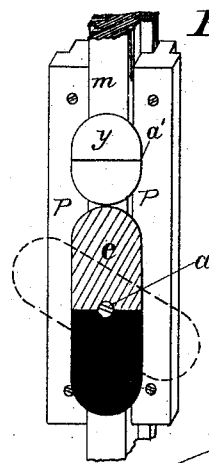
Figure 5:
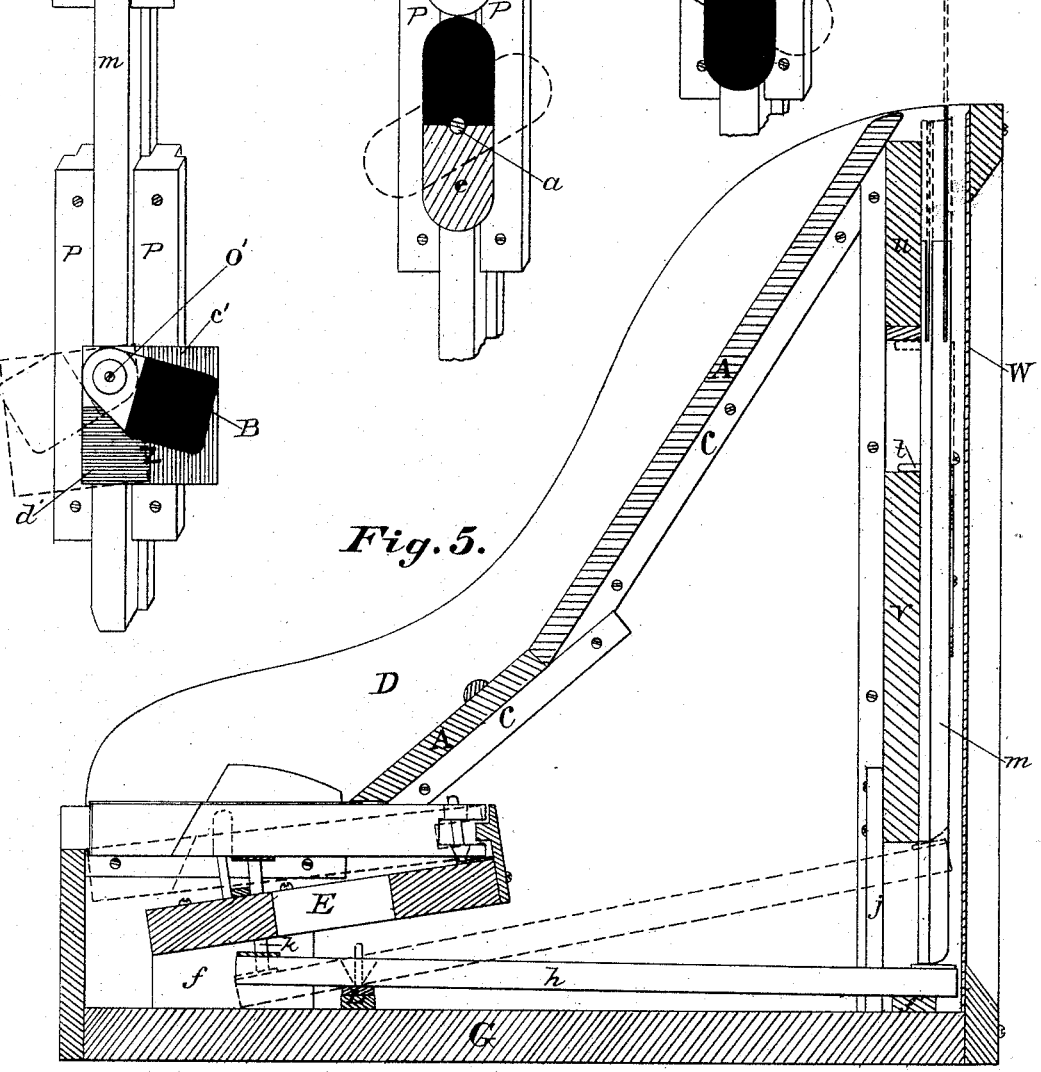

Figure 1 of said drawings shows a front elevation of the apparatus closed. Fig. 2 represents a rear elevation closed. Fig. 3 is a view with the rear cover removed. Fig. 4 is a view with the front cover removed, the apparatus being slightly tipped forward. Fig. 5 shows a cross-section. Fig. 6 is a detail showing the card-carriers and guides with a plain permanent tag and revolving tag with black part uppermost. Fig. 7 is a detail of card-carrier and guides, the carrier provided with a permanent tag having a cross-line, and a revolving tag with orange part uppermost. Fig. 8 shows a detail of a card-carrier and guides, said card-carrier being provided at the top with a card, also provided with adjustable tag and covering-tag.

The detail figures are shown upon a much larger scale than the elevation, that the construction of the several parts may be better understood.

Same letters of reference indicate corresponding parts.

The said apparatus has a front cover, A, which may be either an inclined or curved surface, as desired. This cover is preferably fastened, by screws b, to cleats c on the inside on the ends D. At its base the cover A is cut out to fit about a key-board, E. This key-board is similar to the key-board of a piano. A removal of the cover A exposes to view many of the working parts of the apparatus.

Referring to Fig. 4, blocks or supports f for sustaining the key-board E are seen standing upon the floor G. h are long levers extending across the floor. At the rear the levers extend into narrow slots i between upright guide-strips j. The ends of the levers at the front pass under the key-board, and then find a convenient resting-place upon a bar, L, lying lengthwise of the floor G. At the rear the ends of the levers h touch the floor. At the front, by reason of resting over the bar L, (see Fig. 5,) the ends of the levers are raised a short distance from the floor. Guide-pins are set in the top plane of the bar L. (See Fig. 5.) These pins extend upwardly through holes or slots in the levers h, and prevent them from slipping about and getting out of place. Other pins, k, rest upon the tops of the levers h, at or near their forward ends, and project upwardly against the under sides of the keys. Thus, when a pressure is put upon any one of the keys in the board E, the forward end of said lever will be pressed toward the floor G, and as the bar L acts as a fulcrum-point for the lever h to turn upon the rear end of said lever will be raised. (See Fig 5.) On account of its uses in the apparatus, I have denominated the bar L a "fulcrum-bar."

The above-described disposition of the parts for moving or turning the levers h is for the purpose of operating, elevating, and lowering what I call "card-carriers."

The letter m shows said card-carriers, which are simply long narrow strips or bars standing upright upon the rear ends of the levers h. They are provided at their tops with scores n, for receiving and holding cards o. (See Fig. 6.) Said carriers move up and down between guides p, and are securely confined in position by any convenient means. On the front face of each carrier m is located a stop-pin, t. When pressure is put upon the keys of the board E, the carriers rise between the guides p till the pins t strike against the under side of a cross-bar, u. When the pressure is relaxed the levers h drop and the carriers m fall until the pins t rest upon the cross-bar v. Thus the range of rise and fall of the carriers is the distance between the cross-bars u and v. To break the force of the fall of the carriers, the upper edge of the cross-bar v is provided with a cushion of heavy cloth or other analogous material. The under side of the bar u is also cushioned.

Along the edge of the floor G the ends of the levers rest upon a rubber cushion, $f'$, which saves the levers and prevents any hammering sound when the levers fall.

Referring to the drawings, Fig. 2 shows a rear cover, w, upon which I have represented two music-staffs—one with treble clef and one with bass clef. Preferably the rear cover, w, is a plain white surface and the staffs dead-black lines. On each degree of said staff is a perforation or hole, x, the function of which I will presently describe. Removing the back cover, w, (see Fig. 3,) the reverse view of the card-carriers m and guides p is shown. In this figure the face of each carrier is provided with cards or tags. There are three kinds of these tags: first, the tags represented by the letter y, which I call "permanent" tags, because their position is never changed; second, the tags z, which I call "adjustable" tags, because they are intended to be turned from side to side, as occasion may require; third, tags e, which I call "revolving" tags, because they rotate or revolve upon a centrally-located screw, a.

Each permanent tag is of the same color as the outside cover upon which the staffs are drawn. The permanent tags covering openings or holes x located between the staff-lines are plain blanks. Those covering openings or holes x located on the staff-lines have a corresponding cross-line, thus giving a uniform color to the back cover, w, and also showing continuous and unbroken staff-lines.

The adjustable tags z are in two colors, preferably, partially blue and partially red. In the different figures of the drawings in which the adjustable tags appear the perpendicular shade-lines indicate the parts colored red, and the horizontal shade-lines point out the parts colored blue.

For greater exactness of description, let c indicate the red part of an adjustable tag, and $d'$ the blue part. The revolving tags are also made in two colors, the upper half being usually a dead black, the lower half orange, or some bright color other than those used on the adjustable tags z.

The distribution of the several kinds of tags upon the carriers m is as follows: The permanent tags y, located as before specified, are affixed to those carriers m which are directly operated by the white keys of the board E. In the case of the adjustable tags z there are no perforations directly in front of them or the carriers to which they are affixed. The office of the adjustable tags, when used, is to cover the perforation x first at the right or left of their own carriers. To accomplish this, the tags z are fastened to their carriers by means of screws at one corner, with the main body of the tag projecting from the carriers at right angles, either to the right or left, as desired. (See Fig. 8.) They are operated by the black keys.

In addition to the tags above described, I use a tag, B, which I call a "covering-tag." It is used only in connection with the adjustable tags, and is held in position by the same screw which fastens said adjustable tag to its proper carrier. This tag is, preferably, a dead black. It may easily be turned about on the screw as a pivot so as to cover either the red or blue part of said adjustable tag.

Having thus described the features of my invention, I will now describe its uses and operation.

The apparatus being placed before a class upon a table or desk, with the rear cover, w, presented to the pupils, the instructor takes his position in front of the key-board E, facing his class. At this time the cover w appears to the class as a plain surface provided with music-staffs. It will be assumed that the instructor then touches one of the white keys of the board E and presses it downward. Then, as has been hereinbefore specified, a pin, k, presses upon the end of a lever, h, and causes said lever to turn on the fulcrum-bar L. Thus, as the lever h turns on its fulcrum, its rear end rises and throws upward the card-carrier m resting upon it. By this means a card, o, at the end of the carrier, having printed on it either a numeral or letter, is presented to the class above the top of the apparatus. The elevation of the card-carrier m withdraws a white or permanent tag y from behind its corresponding perforations x, and covers said perforation with the revolving tag just beneath, and causes a disk of black or orange (according to which end of the revolving tag is uppermost) to appear upon the staff where before was a plain white surface. Thus, when a card-carrier provided with a permanent tag is elevated, a black or orange disk will appear, representing a natural letter on that degree of the staff. This disk so made I call a "note," and the operation of producing it I call "forming a note." The note on the staff in each instance corresponds with the letter on the card o and that played upon the key-board.

The card-carriers m are arranged at equal distances, in order to enable the instructor to illustrate to his pupils the order of intervals of the scale, (large and small,) also the order of intervals of the letters on the staff. The black portion of the revolving tag is always uppermost until sharps or flats appear in the signature, (indicating transposition of the scale.) When the letter (of the line or space on which it forms a note) is sharped or flatted in the signature, the revolving tag is turned so that an orange-colored note is formed, indicating that the character called a "natural" must be used to obtain the natural letter.

When a chromatic interval, either a sharp or flat, is desired, the notes are made by the use of the adjustable tags $z$, hereinbefore described, being so turned either to the right or left as to form a red note for sharps and a blue note for flats on the proper degrees of the staff.

The numerals or letters which appear on cards O on card-carriers $m$, which are operated by the black keys of the key-board, are either red or blue, as sharps or flats are desired. Thus, it being desired to drill a class in the use of sharps, the tags $z$ are so adjusted on the carriers that the red-colored section $c'$ will come up and cover the perforations $x$ (when the proper carriers are raised by pressing on the keys) and show red disks or notes on the degrees of the staffs corresponding to the keys touched.

When flats are to be taught, the tags are adjusted to make blue disks on the proper degrees of the staffs. The covering-tag B is used when the sharped or flatted letter (which is indicated by the red or blue tag covered) becomes one of the regular intervals of the scale by transposition. For example, when the scale is transposed from the key of C to G, F sharp becomes the seventh of the scale in the key of G, and by the use of the covering-tag becomes a black note, instead of a red note, as is the case when F sharp is a chromatic interval of the scale, as it is in the key of C.

The cards $o$, which are carried in the grooves $n$ (see Fig. 6) on the tops of the carriers $m$, have numerals printed on one side and letters on the other, so that by slipping the cards from the groove and reversing them the use of numerals or letters can be taught at the will of the instructor.

Letters or numerals, without reference to staff notation, can be taught by screening the staff from the class. Similarly, a class may be drilled in staff notation by removing or screening the cards $o$ and showing only the disks or notes on the staffs.

The advantages of my newly-organized apparatus for teaching vocal-music reading are many. With it the instructor can readily drill by the use of letters, numerals, or notes on the staff, which shall be in either one, two, three, or four parts. All the parts can be presented at the same instant—a thing utterly impossible by any other means of giving instruction in vocal-music reading now known to me.

Contrasting my apparatus with the common methods of giving instruction in vocal-music reading—i. e., the use of charts, blackboards, &c.—demonstrates its great utility.

When a blackboard is used for presenting numerals, letters, or notes to a class for reading, only one of either can be made at a time, and then must be erased before others can be presented, which calls for the expenditure of much time and labor, to say nothing of the annoyance of being besprinkled with crayon-dust. With my apparatus it is obvious that the instructor can more than quadruple his work, for, in addition to his ability to present four parts at the same moment, he loses no time in writing and erasing. He presents the exercise as rapidly as he pleases, simply by fingering the keys of the key-board.

When charts are used, the same exercise appearing day after day, the pupils memorize them; consequently the drill is of no practical value so far as the reading is concerned, for no mental effort is required on the part of the pupils to sing an exercise with which they are already familiar. With my apparatus no exercise appears until the teacher begins to manipulate the keys, and if he wishes to use the same exercise several times in succession it will always be new to the pupils, for they are compelled to read everything as it appears. Thus every lesson or its repetition requires the same mental effort. It insures rapid reading at sight, because the notes or numerals remain in sight only so long as the key is held down by the teacher, thereby obliging the pupil to go through the mental exercise of deciding what the note and its pitch is in the shortest possible time. Again, the teacher may present his musical thoughts to the class and receive their interpretation immediately, and thus be able to judge of the value and correctness of his own composition while in the act of composing—a thing manifestly new and before unknown to the musical profession. By placing the key-board of the apparatus directly above that of a piano or organ, and extending the pins $k$ downward till they rest upon the corresponding keys of the instrument, the pupil or class will be able at the same instant of time to see the printed cards $o$, the disks or notes upon the staff, and receive the proper pitch from the instrument.

Without any departure from the principle of my invention, the mechanism of an organ can be so that one key-board will serve the double purpose of making the notes and giving the musical pitch. Many other advantages might be enumerated. Sufficient have been shown, however, to demonstrate the great utility of my invention.

What I claim as new in an apparatus for teaching vocal-music reading, and desire to make secure to myself by Letters Patent, is—

1. In combination with a music-staff perforated on each degree, whereby the notes are represented, carriers rising and falling by means of the key-board, and having attached to them tags whereby colored disks are caused to appear on the staff and form the notes, substantially as described.

2. A cover provided with music-staffs, said cover being pierced by holes or perforations located on each degree of said staffs, said perforation being for the purpose of representing notes.

3. In combination with a cover provided with a perforated music-staff, the herein-described permanent tags which cover said perforations when they are designed for forming music-notes, part of said permanent tags being plain and of the same hue as the surface of the cover when they cover the perforations between the lines of the music-staff, part of said permanent tags covering the perforations on the lines of the music-staff being provided with cross lines to correspond and fill out staff-lines.

4. In combination with a cover provided with a perforated music-staff, the herein-described adjustable tags $z$, printed in two colors and designed for the purpose of representing chromatic intervals on proper degrees of the perforated music-staff, said tags being capable of adjustment from right to left, as herein specified.

5. In combination with a cover provided with a perforated music-staff, the herein-described revolving tags $e$, made in two colors, and being for the purpose of forming the natural notes upon the degrees of a music staff, perforated as herein described, said revolving tags capable of being turned about on a centrally-located pivot-pin.

6. In combination with a cover provided with a perforated music-staff, the herein-described covering-tags B, printed in some suitable color and designed for the purpose of covering either of the colored parts of an adjustable tag, and capable of being moved from side to side, as and for the purpose herein specified.

7. The herein-described card-carriers $m$, to move up and down between guides $p$, said carriers being provided with stop-pins $t$, and being notched at their tops for the purpose of receiving cards $o$, substantially as herein specified.

8. In combination, the key-board E, mechanism for actuating the card-carriers, the card-carriers, and the tags $e$, coacting to display music-notes upon the degrees of a perforated music-staff, substantially as herein set out.

9. In combination, the key-board E, mechanism for actuating a card-carrier, the card-carriers, and the herein-described adjustable tag $z$, all co-operating for the purpose of displaying notes upon the staff, representing chromatic intervals of the scale.

10. The combination, with the cover or surface $w$, provided with music-staffs perforated on each degree, of card-carriers $m$ and tags $e$, for forming notes upon said music-staff when said carriers and tags are actuated from a keyboard, substantially as herein specified.

11. The combination, with the cover or surface $w$, provided with music-staffs perforated on each degree, of card-carriers $m$ and tags $z$, for forming notes to represent sharps or flats upon said music-staff, substantially as herein set out.

12. The combination, with the carriers $m$, of the adjustable tags $z$ and covering-tags B, substantially as herein set out.

13. The combination of the cross-bars $u$ and $v$, cushioned, as described, and stop-pins $t$ with the carriers $m$, whereby the rise and fall of the carriers are regulated, substantially as described.

14. The combination of a front cover, A, adjusted to fit about a key-board, the ends D, cover $w$, provided with music-staffs perforated, as described, and floor G, all the parts combined, as shown, for the purpose of making a convenient case for containing the operating mechanism, substantially as herein specified.

15. The combination, with the carriers $m$, of the permanent tags $y$, constructed and arranged to operate substantially as herein set out.

16. The combination, with the carriers $m$, of the revolving tags $e$, constructed and arranged to operate substantially as herein set out.

17. The combination, with a perforated music-staff, of the carriers $m$, tags $e$, and cards $o$, for the purpose of simultaneously representing notes on the degrees of said perforated staff, with their corresponding numerals or letters shown upon said cards $o$.

18. The combination, with a perforated music-staff, of carriers $m$, tags $z$, and cards $o$, for the purpose of simultaneously representing chromatic intervals of the scale by notes upon the degrees of said perforated staff, with their corresponding numerals or letters shown upon said cards $o$.

19. The combination, with a perforated music-staff, of the card-carriers $m$, the tags $z$, covering-tags B, and cards $o$, simultaneously representing notes on the degrees of said perforated staff, with their corresponding numerals or letters shown upon said cards $o$.

20. The combination of the key-board E, pins $k$, levers $h$, bar L, and guide-strips $j$, whereby when in operation said levers $h$ are kept in position, substantially as herein set out.

In testimony that I claim the foregoing as my own I have affixed my signature in the presence of two witnesses.

WILLIAM L. FITCH.

Witnesses:
WILLIAM H. PURINTON,
HERBERT G. BRIGGS.